(12) United States Patent
Kawamura et al.

(10) Patent No.: US 11,373,442 B2
(45) Date of Patent: Jun. 28, 2022

(54) COLLATION DEVICE, COLLATION METHOD, AND COMPUTER PROGRAM PRODUCT

(71) Applicant: KABUSHIKI KAISHA TOSHIBA, Tokyo (JP)

(72) Inventors: Naoki Kawamura, Yokohama Kanagawa (JP); Susumu Kubota, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 44 days.

(21) Appl. No.: 17/002,601

(22) Filed: Aug. 25, 2020

(65) Prior Publication Data
US 2021/0295014 A1  Sep. 23, 2021

(30) Foreign Application Priority Data
Mar. 17, 2020  (JP) .............................. JP2020-045897

(51) Int. Cl.
*G06V 40/16*  (2022.01)
*G06K 9/62*  (2022.01)

(52) U.S. Cl.
CPC .......... *G06V 40/168* (2022.01); *G06K 9/627* (2013.01); *G06K 9/6215* (2013.01);
(Continued)

(58) Field of Classification Search
CPC .......... G06K 9/00268; G06K 9/00288; G06K 9/6215; G06K 9/6232; G06K 9/6255; G06K 9/627; G06V 40/168; G06V 40/172
See application file for complete search history.

(56) References Cited

U.S. PATENT DOCUMENTS

| 2011/0289028 A1 | 11/2011 | Sato |
| 2012/0082370 A1 | 4/2012 | Yasukawa et al. |
| 2021/0019541 A1* | 1/2021 | Wang ................... G06K 9/6273 |

FOREIGN PATENT DOCUMENTS

| JP | 5408143 | 2/2014 |
| WO | WO 2010/122721 | 10/2010 |

OTHER PUBLICATIONS

J. Deng et al., "ArcFace: Additive Angular Margin Loss for Deep Face Recognition." In Proceedings of the IEEE Conference on Computer Vision and Pattern Recognition, pp. 4690-4699, 2019.

(Continued)

*Primary Examiner* — Casey L Kretzer
(74) *Attorney, Agent, or Firm* — Knobbe, Martens, Olson & Bear, LLP (57) ABSTRACT

According to an embodiment, a collation device includes a hardware processor configured to: generate, based at least in part on input data, an input vector comprising input data features indicating features of the input data, the input data features comprising D number of features, D being an integer equal to or larger than two; and generate first specification information that specifies d selected features among the input data features of the input vector, based at least in part on a plurality of reference vectors and the input vector, the plurality of reference vectors each comprising reference features in the same form as the input vector, the reference features comprising the D number of features, d being an integer equal to or larger than one and smaller than D.

14 Claims, 8 Drawing Sheets

(52) U.S. Cl.
CPC ......... *G06K 9/6232* (2013.01); *G06K 9/6255* (2013.01); *G06V 40/172* (2022.01)

(56) References Cited

OTHER PUBLICATIONS

K. Zhou, et al., "Omni-Scale Feature Learning for Person Re-Identification." In Proceedings of the IEEE International Conference on Computer Vision, pp. 3702-3712, 2019.

\* cited by examiner

COLLATION DEVICE, COLLATION METHOD, AND COMPUTER PROGRAM PRODUCT

CROSS-REFERENCE TO RELATED APPLICATIONS

This application is based upon and claims the benefit of priority from Japanese Patent Application No. 2020-045897, filed on Mar. 17, 2020; the entire contents of which are incorporated herein by reference.

FIELD

Embodiments described herein relate generally to a collation device, a collation method, and a computer program product.

BACKGROUND

A collation device for face authentication, person collation, and the like determines whether a person included in image data input as a query is identical to a person included in image data registered in advance. Such a collation device initially extracts image features of each of the input image data and the registered image data and generates a feature vector indicating the amount of extracted features. Subsequently, the collation device calculates the degree of similarity between the feature vector of the input image data and the feature vector of the registered image data. Then, when the calculated degree of similarity is higher than a threshold, the collation device determines that the person included in the input image data is identical to the person included in the registered image data.

The feature vector includes a plurality of features. Each feature amount is a scalar, represents a feature of image data, and is calculated from the image data by a predetermined algorithm.

The degree of similarity is a scalar indicating the degree of similarity between two vectors. For example, the higher degree of similarity indicates that the compared two vectors are more similar to each other, and the degree of similarity is highest when the two vectors are completely identical to each other.

The purpose of calculating the degree or after converting each image data into a feature vector is to have a lowered degree of similarity between different persons and facilitate distinction between the different persons.

However, for example, the features of two feature vectors of persons who are very similar to but different from each other include features that have a small difference there between and adversely affect collation in some cases. The degree of similarity between two feature vectors including such features tends to be high, and it is highly likely that the feature vectors are falsely determined to belong to an identical person. In addition, such features that adversely affect collation vary depending on the sample.

For example, WO 2010/122721 discloses means for independently performing feature selection on the feature vector of each of input image data and registered image data and using a result of each selection to accurately perform collation by ignoring the features of, for example, any occluded part and the backgrounds of images, which are unnecessary for collation. However, for example, when different persons are included in the input image data and the registered image data, respectively, and features indicating features of the persons are similar to each other, the collation using selected features has no instrument for distinguishing the different persons, and thus can be still potentially wrongly performed.

DETAILED DESCRIPTION

According to an embodiment, a collation device includes a hardware processor configured to: generate an input vector including D features extracted from the input data, where D is an integer equal to or larger than two; generate first specification information that specifies d selected features among the D features of the input vector, based on a plurality of reference vectors and the input vector, the plurality of reference vectors each including D features in the same form as the input vector, d being an integer equal to or larger than one and smaller than D; and perform collation to determine whether a class to which the input data belongs is identical to a class to which registered data from which a registered vector is derived belongs, based on a degree of similarity between the input vector and the registered vector with respect to the d selected features specified by the first specification information, the registered vector including D features in the same form as the input vector.

The following describes a collation device 10 according to embodiments with reference to the accompanying drawings.

First Embodiment

Figure 1:
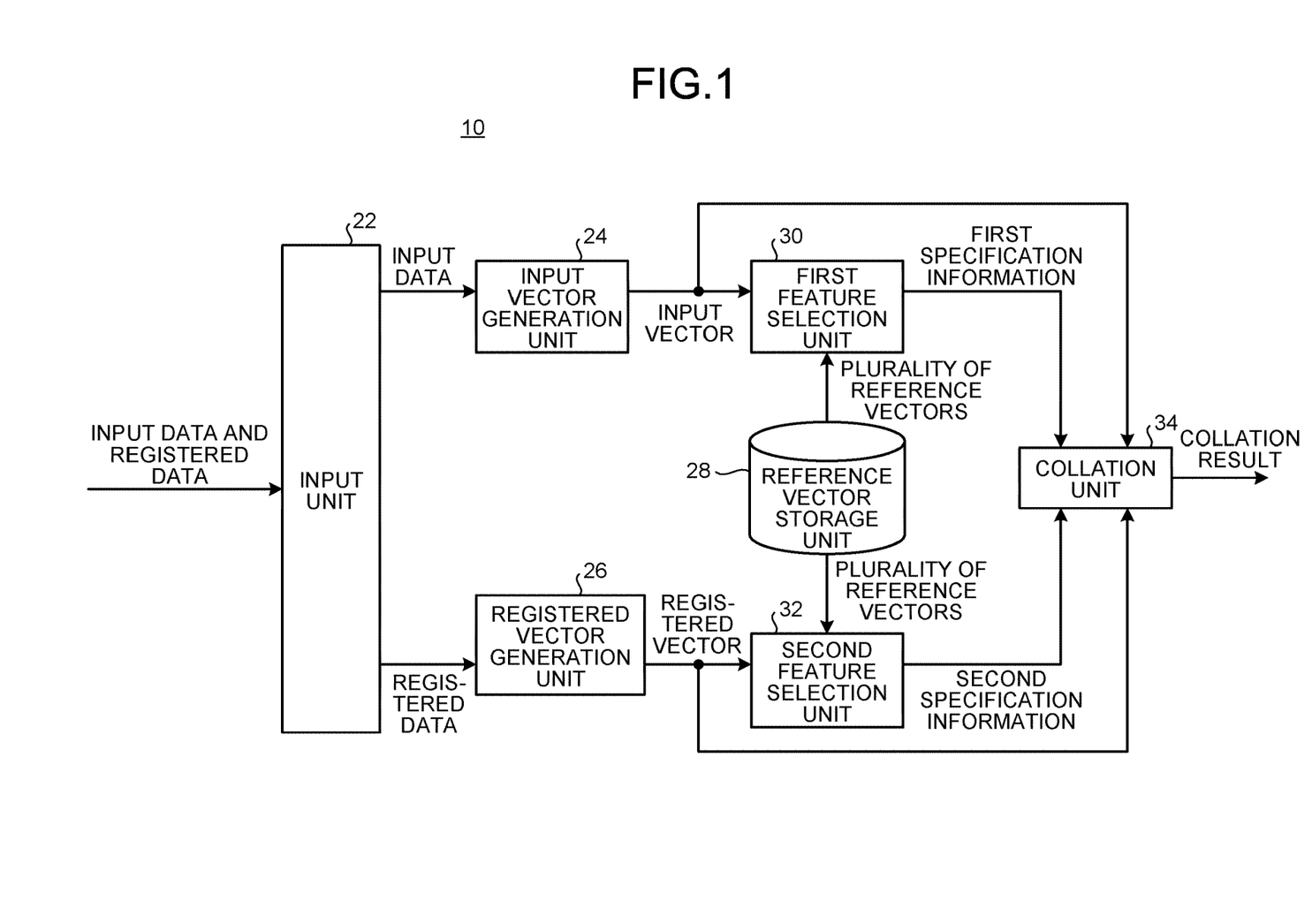
FIG. 1 is a diagram illustrating the configuration of a collation device according to a first embodiment.

FIG. 1 is a diagram illustrating the configuration of the collation device 10 according to a first embodiment. The collation device 10 according to the first embodiment receives input data and registered data and performs collation to determine whether a class to which the input data belongs is identical to a class to which the registered data belongs.

The input data and the registered data each belong to any one of a plurality of classes. For example, when the input data and the registered data are face image data obtained by capturing an image of the face of a person or person image data obtained by capturing the entire image of the person, the class thereof is a person's name, identification information, or the like for identifying the person. When the input data and the registered data are face image data or person image data, the collation device 10 performs collation to determine whether a person in the input image data is identical to a person in the registered image data.

A class may be a category such as cat or dog. The class to which the input data belongs may be unknown.

The collation device 10 includes an input unit 22, an input vector generation unit 24, a registered vector generation unit 26, a reference vector storage unit 28, a first feature selection unit 30, a second feature selection unit 32, and a collation unit 34.

The input unit 22 receives the input data and the registered data. The input unit 22 provides the input data to the input vector generation unit 24. The input unit 22 provides the registered data to the registered vector generation unit 26.

The input vector generation unit 24 generates, based on the input data received from the input unit 22, an input vector including D (D is an integer equal to or larger than two) features indicating features of the input data. The D features are extracted by calculating one kind or a plurality of kinds among a hand-crafted feature descriptor such as a scale-invariant feature transform (SIFT) descriptor, a feature descriptor based on a deep neural network, and the like.

For example, when the input data is face image data of a person, the input vector generation unit 24 may generate the input vector by extracting features from the input data by using a method Disclosed in Non Patent Literature 1. For example, when the input data is person image data including the entire image of a person, the input vector generation unit 24 may generate the input vector by extracting features from the input data by using a method disclosed in Non Patent Literature 2.

The input vector generation unit 24 generates the input vector in which the D features are described in a predetermined form. For example, the input vector generation unit 24 generates the input vector in which a plurality of features each binarized as "1" or "−1" are disposed in one column. The input vector generation unit 24 provides the generated input vector to the first feature selection unit 30 and the collation unit 34.

The registered vector generation unit 26 generates, based on the registered data received from the input unit 22, a registered vector including the D features indicating features of the registered data. The registered vector is generated by the same algorithm as the input vector and described in the same form as the input vector. The registered vector generation unit 26 may be achieved by an arithmetic device, a software module, a function, or the like shared with the input vector generation unit 24. The registered vector generation unit 26 provides the generated registered vector to the second feature selection unit 32 and the collation unit 34.

The reference vector storage unit 28 stores a reference data set including a plurality of reference vectors. Each reference vector includes the D features in the same form as the input vector and the registered vector. The reference vector is generated by extracting features from original data in the same form as the input data and the registered data by using the same algorithm as the input vector and the registered vector.

A plurality of original data from which the reference vectors are derived are associated with a plurality of classes in a one-to-one manner. In other words, each of the plurality of original data belongs to a unique class different from those of the other original data in the reference data set. Thus, the reference data set does not include two or more reference vectors belonging to an identical class.

For example, when the input data and the registered data are face image data or person image data, the plurality of original data from which the reference vectors are derived are obtained by capturing images of persons different from each other. Thus, in this case, the reference data set is composed of classes that are unique to each other, where the data set does not include two or more reference vectors derived from face image data or person image data obtained by capturing an image of the same person.

The first feature selection unit 30 acquires the reference vectors included in the reference data set stored in the reference vector storage unit 28. In addition, the first feature selection unit 30 receives the input vector that is output from the input vector generation unit 24. Then, the first feature selection unit 30 generates, based on the reference vectors and the input vector, first specification information that specifies d (d is an integer equal to or larger than one and smaller than D) selected features among the D features included in the input vector.

The first specification information may be any information that can specify d selected features among the D features included in the input vector. In the present embodiment, the first specification information is, for example, data in a vector form in which D flags each having any value of "0" and "1" are arranged. Each flag indicates whether a feature amount at the corresponding position in the input vector is included in the d selected features. In the present embodiment, the flag having the value of "1" indicates that the feature amount at the corresponding position in the input vector is included in the d selected features, and the flag having the value of "0" indicates that the feature amount at the corresponding position in the input vector is not included in the d selected features.

In the present embodiment, the first feature selection unit 30 selects the d selected features to lower the degree of similarity between the input vector in which any feature amount other than the d selected features is masked and each of K (K is an integer equal to or larger than one) reference vectors among the reference vectors, and generates the first specification information that specifies the selected features.

In calculation of the degree of similarity between vectors, masking of a feature amount means that no influence of the masked feature amount is included in a calculation result of the distance calculation. For example, the collation unit 34 replaces the masked feature amount with "0" and calculates the distance between vectors.

Further details of the configuration and processing of the first feature selection unit 30 will be described below with reference to FIGS. 3 and 4. The first feature selection unit 30 provides the first specification information to the collation unit 34.

The second feature selection unit 32 acquires the reference vectors included in the reference data set stored in the reference vector storage unit 28. In addition, the second feature selection unit 32 receives the registered vector output from the registered vector generation unit 26. Then, the second feature selection unit 32 generates, based on the reference vectors and the registered vector, second specification information that specifies the d selected features among the D features included in the registered vector.

The second specification information is data in the same form as the first specification information. For example, the second specification information is data in which D flags each having any value of "0" and "1" are arranged. In this case, each flag indicates whether a feature amount at the corresponding position in the registered vector is included in the d selected features.

In the present embodiment, the second feature selection unit 32 selects the d selected features to lower the degrees of similarity between the registered vector in which any feature amount other than the d selected features is masked and each of K reference vectors among the reference vectors, and generates the second specification information that specifies the selected features.

The configuration and processing of the second feature selection unit 32 are the same as the first feature selection unit 30, and further details thereof will be described below with reference to FIGS. 3 and 4. The second feature selection unit 32 may be achieved by an arithmetic device, a software module, a function, or the like common to the first feature selection unit 30. The second feature selection unit 32 provides the second specification information to the collation unit 34.

The collation unit 34 acquires a pair of the input vector and the first specification information. In addition, the collation unit 34 acquires a pair of the registered vector and the second specification information.

The collation unit 34 calculates a first degree of similarity that is the degree of similarity between the registered vector and the input vector, with respect to the d selected features specified by the first specification information. For example, the collation unit 34 calculates, as the first degree of similarity, the degree of similarity between the registered vector and the input vector in which any feature amount other than the d selected features specified by the first specification information is masked.

In addition, the collation unit 34 calculates a second degree of similarity that is the degree of similarity between the registered vector and the input vector, with respect to the d selected features specified by the second specification information. For example, the collation unit 34 calculates, as the second degree of similarity, the degree of similarity between the input vector and the registered vector in which any feature amount other than the d selected features specified by the second specification information is masked.

In the degree of similarity calculation, masking of a feature amount means that no influence of the masked feature amount is included in a calculation result of the degree of similarity calculation. For example, the collation unit 34 replaces the masked feature amount with "0", and calculates the degree of similarity.

Then, the collation unit 34 performs collation to determine whether the class to which the input data belongs is identical to the class to which the registered data belongs, based on the first degree of similarity and the second degree of similarity. For example, the collation unit 34 calculates an average value of the first degree of similarity and the second degree of similarity and performs collation to determine whether the class to which the input data belongs is identical to the class to which the registered data belongs, based on the calculated average value. In this case, when the average value is higher than a threshold determined in advance, the collation unit 34 determines that the class to which the input data belongs is identical to the class to which the registered data belongs.

The collation unit 34 may perform collation to determine whether the class to which the input data belongs is identical to the class to which the registered data belongs, based on one of the first degree of similarity and the second degree of similarity. For example, when one of the first degree of similarity and the second degree of similarity is higher than a threshold determined in advance, the collation unit 34 determines that the class to which the input data belongs is identical to the class to which the registered data belongs. When one of the first degree of similarity and the second degree of similarity is equal to or lower than the threshold determined in advance, the collation unit 34 may determine that the class to which the input data belongs is not identical to the class to which the registered data belongs.

Then, the collation unit 34 outputs a result of the collation to an external device or the like. Accordingly, the collation device 10 can notify a user or the like of whether the class to which the input data belongs is identical to the class to which the registered data belongs.

Figure 2:
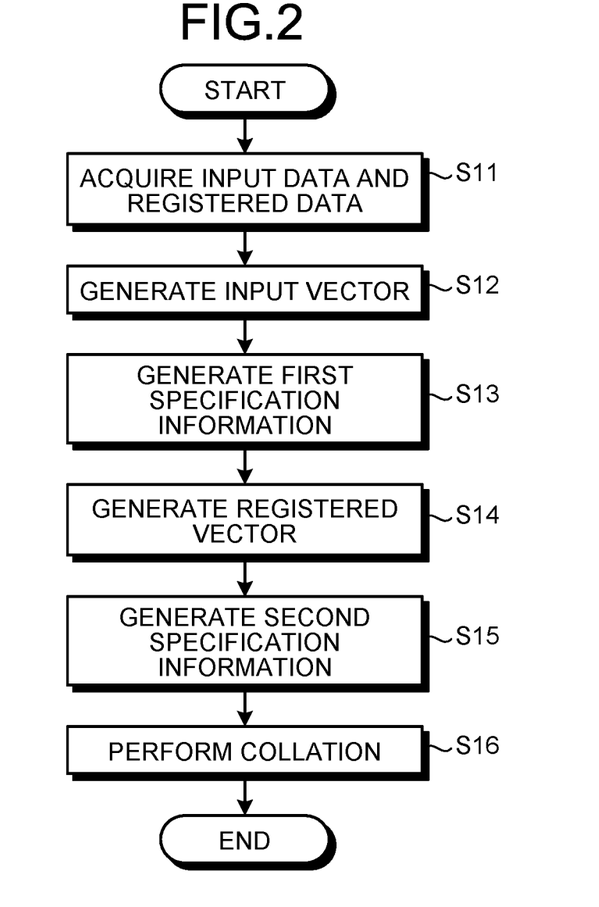
FIG. 2 is a flowchart illustrating the process of processing at the collation device according to the first embodiment.

FIG. 2 is a flowchart illustrating the process of processing at the collation device 10 according to the first embodiment. The collation device 10 according to the first embodiment executes processing through the process illustrated in FIG. 2.

First at S11, the collation device 10 acquires the input data and the registered data. Subsequently at S12, the collation device 10 generates the input vector based on the input data. Subsequently at S13, the collation device 10 generates, based on the reference vectors included in the reference data set and the input vector, the first specification information that specifies the d selected features among the D features included in the input vector.

Subsequently at S14, the collation device 10 generates the registered vector based on the registered data. Subsequently at S15, the collation device 10 generates, based on the reference vectors included in the reference data set and the registered vector, the second specification information that specifies the d selected features among the D features included in the registered vector.

Subsequently at S16, the collation device 10 calculates the first degree of similarity that is the degree of similarity between the registered vector and the input vector, with respect to the d selected features specified by the first specification information. In addition, the collation device 10 calculates the second degree of similarity that is the degree of similarity between the registered vector and the input vector, with respect to the d selected features specified by the second specification information. Then, the collation device 10 performs collation to determine whether the class to which the input data belongs is identical to the class to which the registered data belongs, based on the first degree of similarity and the second degree of similarity.

When having ended the processing at S16, the collation device 10 ends the present process. The collation device 10 executes the above-described processing at S11 to S16 upon each acquisition of a pair of the input data and the registered data.

Figure 3:
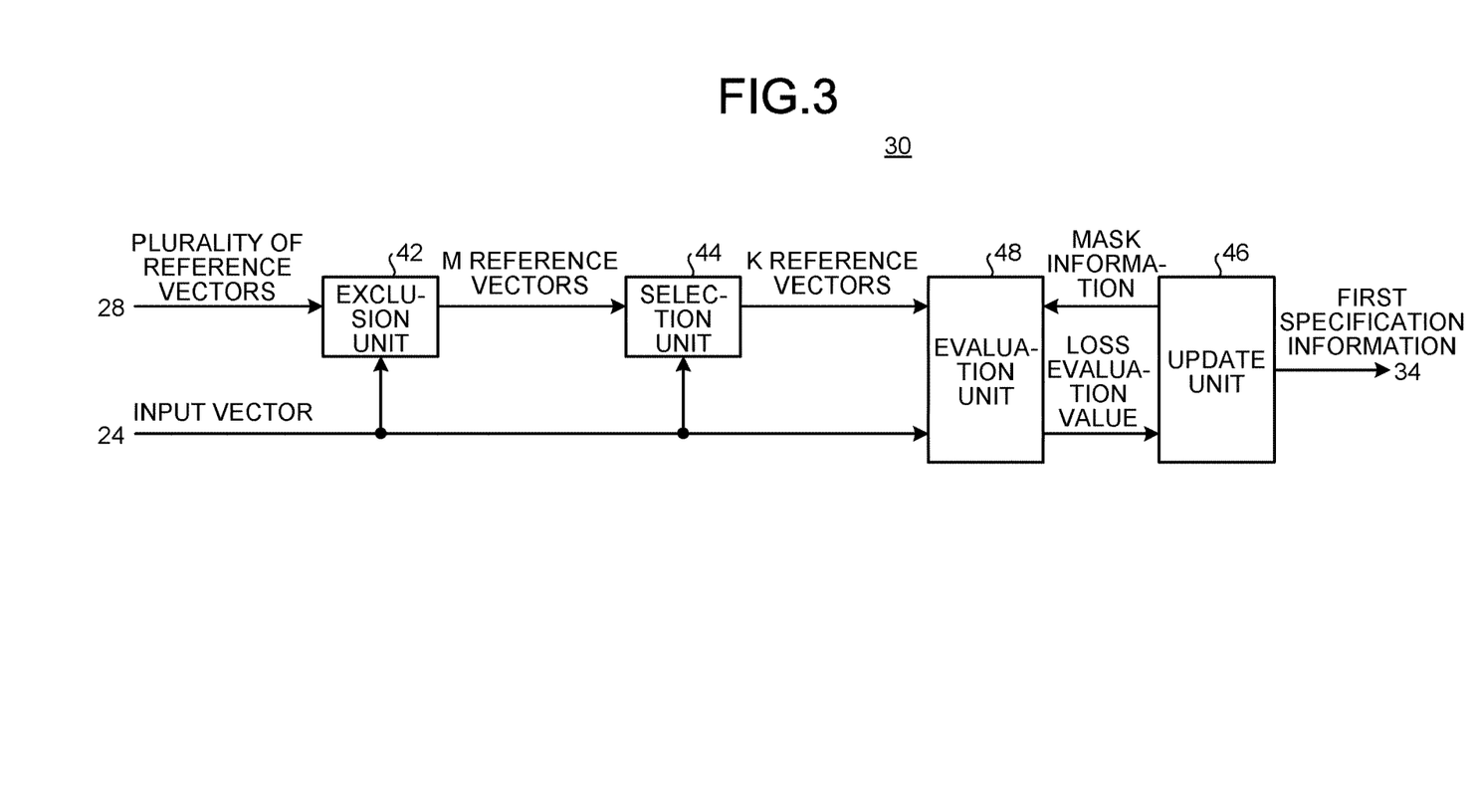
FIG. 3 is a diagram illustrating the configuration of a first feature selection unit.

FIG. 3 is a diagram illustrating the configuration of the first feature selection unit 30. The first feature selection unit 30 and the second feature selection unit 32 have configurations identical to each other. Hereinafter, the configuration of the first feature selection unit 30 will be described as an example.

The first feature selection unit 30 includes an exclusion unit 42, a selection unit 44, an update unit 46, and an evaluation unit 48.

The exclusion unit 42 acquires the reference vectors from the reference vector storage unit 28. In addition, the exclusion unit 42 acquires the input vector form the input vector generation unit 24.

The exclusion unit 42 selects M (M is a number equal to or larger than K) reference vectors by excluding a predetermined number of reference vectors similar to the input vector among the reference vectors. The predetermined number is any number equal to or larger than zero. The number M is an integer smaller than the number of reference vectors included in the reference data set.

For example, the exclusion unit 42 calculates the degree of similarity of each reference vector and the input vector.

Then, the exclusion unit 42 excludes the predetermined number of reference vectors having highest degrees of similarity among the reference vectors. Accordingly, the exclusion unit 42 can select the M reference vectors.

In this manner, the exclusion unit 42 obtains the M reference vectors except for a reference vector of the class to which the input data belongs by excluding the predetermined number of reference vectors similar to the input vector among the reference vectors. The exclusion unit 42 provides the M reference vectors to the selection unit 44.

The selection unit 44 acquires the M reference vectors from the exclusion unit 42. In addition, the selection unit 44 acquires the input vector from the input vector generation unit 24.

The selection unit 44 selects K reference vectors similar to the input vector among the M reference vectors. For example, the selection unit 44 calculates the degree of similarity between each of the M reference vectors and the input vector. Then, the selection unit 44 selects the K reference vectors having highest degrees of similarity among the M reference vectors. The selection unit 44 provides the K reference vectors to the evaluation unit 48.

The K reference vectors selected by the selection unit 44 are selected from among the M reference vectors. Thus, the K reference vectors are each selected to be similar to the input vector but different from the class to which the input data belongs. For example, when the input data is face image data or person image data, the K reference vectors are each expected to be of another person having a high degree of similarity with the input vector.

The update unit 46 executes processing of selecting the d selected features among the D features included in the input vector. Then, the update unit 46 generates the first specification information that specifies the d selected features that have been selected, and outputs the generated first specification information to the collation unit 34.

In the processing of selecting the d selected features, the update unit 46 selects the d selected features by excluding (D−d) features for which loss change amounts are large, from among the D features. The loss change amount is a change amount from a loss evaluation value when a target feature amount is included in the d selected features to the loss evaluation value when the target feature amount is not included in the d selected features. The loss evaluation value is a value depending on the degree of similarity between the input vector in which the feature amount not included in the d selected features is masked and each of the K reference vectors.

In the processing of selecting the d selected features, the update unit 46 selects the d selected features specified by the first specification information, by detecting the (D−d) features for which the loss change amounts are large, from among the D features and excluding the (D−d) features from among the D features.

More specifically, in the processing of selecting the d selected features, the update unit 46 performs processing as follows.

The update unit 46 generates mask information indicating whether each of the D features included in the input vector is included in the d selected features. The mask information includes D bits corresponding to the D features. Each of the D bits is set to "1" when the corresponding feature amount is included in the selected features, or "0" when the corresponding feature amount is not included in the selected features.

The update unit 46 executes processing of updating the bit value from "1" to "0" for each of the D bits included in the mask information, from a state in which the values of all bits are set to "1" to a state in which the values of (D−d) bits are set to "0".

In the update processing, the update unit 46 acquires the loss evaluation value for each bit having a value set to "1" in the mask information. More specifically, the update unit 46 provides, to the evaluation unit 48, the mask information in which the value of a target bit is changed from "1" to "0", and acquires the loss evaluation value from the evaluation unit 48.

Subsequently in the update processing, the update unit 46 calculates the loss change amount for each bit having a value set to "1". In this case, the loss change amount is a change amount from the loss evaluation value acquired when the value of the target bit is set to "1" to the loss evaluation value acquired when the value of the target bit is set to "0". Then, in the update processing, the update unit 46 specifies a bit having a maximum loss change amount among bits having values set to "1" and changes the value of the specified bit in the mask information from "1" to "0".

Then, when having executed the update processing until the values of d bits among the D bits included in the mask information are set to "1" whereas the values of (D−d) bits are set to "0", the update unit 46 completes the processing of selecting the d selected features.

The evaluation unit 48 acquires the K reference vectors from the selection unit 44. The evaluation unit 48 also acquires the input vector. In addition, the evaluation unit 48 receives the mask information from the update unit 46. Having received the mask information, the evaluation unit 48 calculates the loss evaluation value and sends the loss evaluation value back to the update unit 46.

When having received the mask information, the evaluation unit 48 calculates the loss evaluation value by executing, for example, calculation indicated by Expression (1) below.

$$L(w_i) = \sum_{k=1}^{K} [(w_i \circ x_i)^T y_i^k]^2 \qquad (1)$$

In Expression (1), $w_i$ represents the mask information, $x_i$ represents the input vector, $y_i^k$ represents the k-th reference vector among the K reference vectors, i represents an index that identifies a sample feature vector, k represents an arbitrary integer of 1 to K, and $L(w_i)$ represents the loss evaluation value for $w_i$.

In Expression (1), a circle character between $w_i$ and $x_i$ represents element-wise multiplication of the mask information and the input vector. In Expression (1), T represents vector transpose.

For example, by executing the calculation indicated by Expression (1), the evaluation unit 48 can calculate the loss evaluation value that is a value depending on the degree of similarity between the input vector in which any feature amount included in the selected features is masked and each of the K reference vectors.

Expression (1) is exemplary calculation of the loss evaluation value when the input vector and each reference vector are vectors in which a plurality of features each binarized as "1" or "−1" are disposed in one row or one column. The evaluation unit 48 may calculate the loss evaluation value through other calculation. For example, the evaluation unit 48 may execute absolute-value calculation in place of the square calculation in Expression (1). The square calculation does not need to be executed when the elements of the input vector and the reference vector do not take negative values.

The second feature selection unit 32 has a configuration identical to that of the first feature selection unit 30 illustrated in FIG. 3. However, the exclusion unit 42, the selection unit 44, the update unit 46, and the evaluation unit 48 of the second feature selection unit 32 executes processing using the registered vector in place of processing using the input vector. In addition, the update unit 46 of the second feature selection unit 32 generates the second specification information in place of the first specification information.

The exclusion unit 42 of the second feature selection unit 32 can acquire the class of the registered vector and the class of each reference vector in some cases. In such a case, the exclusion unit 42 may select the M reference vectors by excluding any reference vector of a class identical to that of the registered vector among the reference vectors instead of excluding the predetermined number of reference vectors similar to the input vector among the reference vectors. Through such processing, as well, the exclusion unit 42 can exclude any reference vector belonging to a class identical to that of the registered vector.

Figure 4:
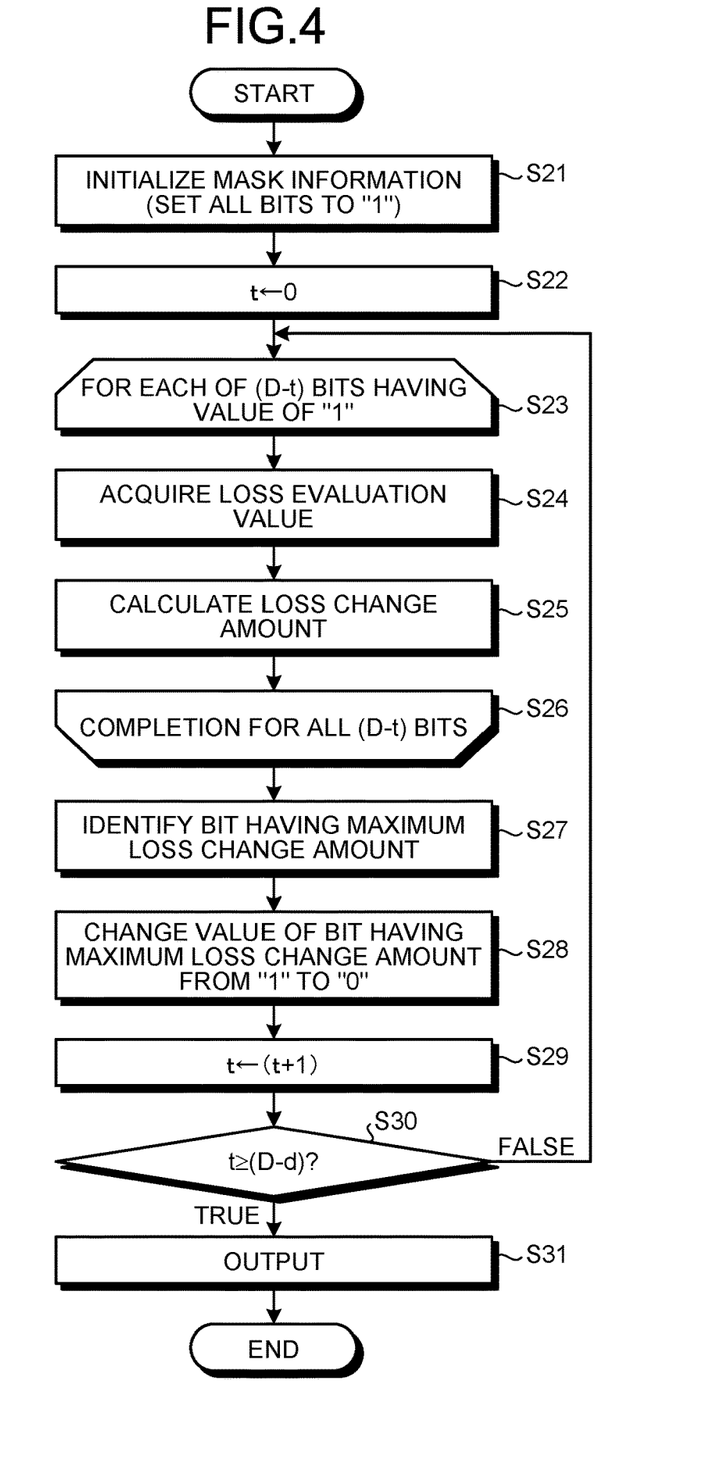
FIG. 4 is a flowchart illustrating the process of processing at an update unit.

FIG. 4 is a flowchart illustrating the process of processing at the update unit 46. The update unit 46 executes processing through the process illustrated in FIG. 4.

First at S21, the update unit 46 initializes the mask information. Specifically, the update unit 46 sets the values of all D bits included in the mask information to "1".

Subsequently at S22, the update unit 46 substitutes "0" into a variable t indicating the number of times of loop. Subsequently, in loop processing between S23 and S26, the update unit 46 executes processing at S24 and S25 for each of (D−t) bits having a value of "1" among the D bits included in the mask information.

At S24, the update unit 46 provides, to the evaluation unit 48, the mask information when the value of a target bit is changed from "1" to "0", and acquires the loss evaluation value from the evaluation unit 48. Subsequently at S25, the update unit 46 calculates the loss change amount indicating a change amount from the loss evaluation value when the value of the target bit in the mask information is not changed to "0" to the loss evaluation value when the value of the target bit in the mask information is changed to "0".

When having completed the processing at S24 and S25 for all (D−t) target bits, the update unit 46 advances the process to S27.

At S27, the update unit 46 identifies a bit having a maximum loss change amount among the (D−t) target bits. Subsequently at S28, the update unit 46 changes, from "1" to "0", the value of the bit having a maximum loss change amount in the mask information.

Subsequently at S29, the update unit 46 substitutes (t+1) into t. Subsequently at S30, the update unit 46 determines whether t≥(D−d) is satisfied. When t≥(D−d) is not satisfied (false at S30), the update unit 46 returns the process to S23 and repeats the processing at S23 and later.

When t≥(D−d) is satisfied (true at S30), the update unit 46 advances the process to S31. Specifically, when the values of d bits among the D bits included in the mask information are set to "1" whereas the values of (D−d) bits are set to "0", the update unit 46 advances the process to S31.

At S31, the update unit 46 specifies, as the d selected features, the D features corresponding to the bits having values set to "1" in the mask information among the D features included in the input vector. Then, the update unit 46 generates the first or second specification information that specifies as the d selected features among the D features included in the input vector, and provides the generated first or second specification information to the collation unit 34. The update unit 46 may provide the mask information as the first specification information or the second specification information to the collation unit 34.

When having ended the processing up to S31, the update unit 46 ends the present process. Through execution of the above-described processing, the update unit 46 can select the d selected features by excluding the (D−d) features for which loss change amounts are large, from among the D features.

Figure 5:
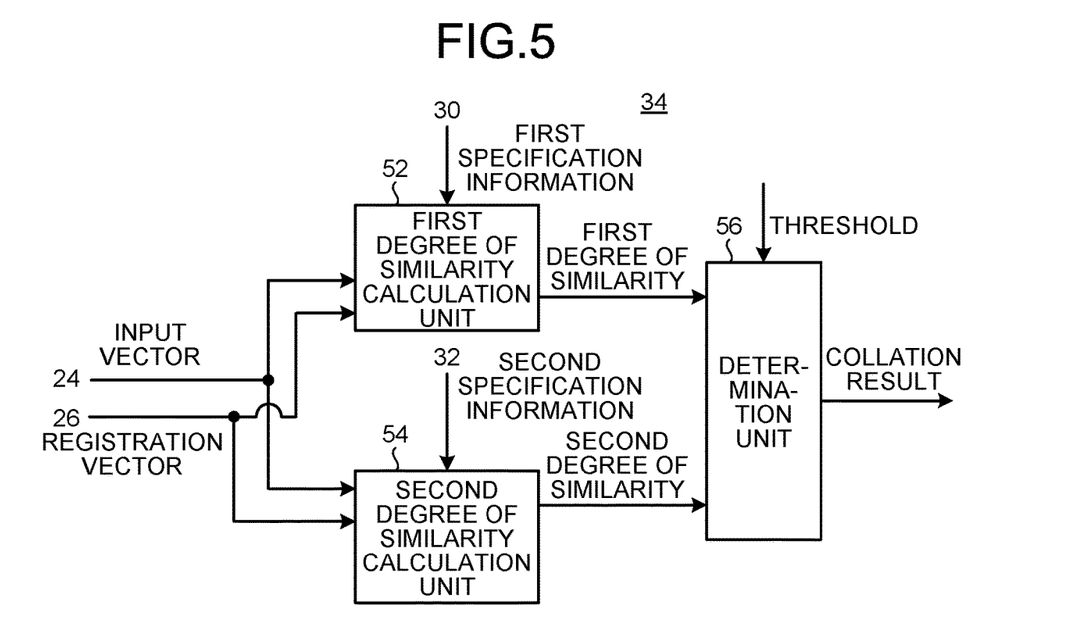
FIG. 5 is a diagram illustrating the configuration of a collation unit.

FIG. 5 is a diagram illustrating the configuration of the collation unit 34. The collation unit 34 includes a first degree of similarity calculation unit 52, a second degree of similarity calculation unit 54, and a determination unit 56.

The first degree of similarity calculation unit 52 acquires the input vector from the input vector generation unit 24, acquires the registered vector from the registered vector generation unit 26, and acquires the first specification information from the first feature selection unit 30. Then, the first degree of similarity calculation unit 52 calculates the first degree of similarity that is the degree of similarity between the registered vector and the input vector, with respect to the d selected features specified by the first specification information.

For example, the first degree of similarity calculation unit 52 calculates, as the first degree of similarity, the degree of similarity between the input vector in which any feature amount other than the d selected features specified by the first specification information is masked and the registered vector. The first degree of similarity calculation unit 52 provides the first degree of similarity to the determination unit 56.

The second degree of similarity calculation unit 54 acquires the input vector from the input vector generation unit 24, acquires the registered vector from the registered vector generation unit 26, and acquires the second specification information from the second feature selection unit 32. Then, the second degree of similarity calculation unit 54 calculates the second degree of similarity that is the degree of similarity between the registered vector and the input vector, with respect to the d selected features specified by the second specification information.

For example, the second degree of similarity calculation unit 54 calculates, as the second degree of similarity, the degree of similarity between the registered vector in which any feature amount other than the d selected features specified by the second specification information is masked and the input vector. The second degree of similarity calculation unit 54 provides the second degree of similarity to the determination unit 56.

The determination unit 56 performs collation to determine whether the class to which the input data belongs is identical to the class to which the registered data belongs, based on the first degree of similarity and the second degree of similarity. For example, the determination unit 56 performs collation to determine whether the class to which the input data belongs is identical to the class to which the registered data belongs, based on the average value of the first degree of similarity and the second degree of similarity. For example, when the average value is higher than a threshold set in advance, the determination unit 56 determines that the class to which the input data belongs is identical to the class to which the registered data belongs.

Alternatively, the determination unit 56 may perform collation to determine whether the class to which the input data belongs is identical to the class to which the registered data belongs, based on one of the first degree of similarity and the second degree of similarity. For example, when one of the first degree of similarity and the second degree of similarity is higher than a threshold set in advance, the determination unit 56 determines that the class to which the input data belongs is identical to the class to which the registered data belongs. Alternatively, when one of the first degree of similarity and the second degree of similarity is equal to or lower than the threshold set in advance, the determination unit 56 may determine that the class to which the input data belongs is not identical to the class to which the registered data belongs.

When the determination unit 56 performs collation by using only the first degree of similarity, the collation device 10 need not include the second feature selection unit 32 and the second degree of similarity calculation unit 54. When the determination unit 56 performs collation by using only the second degree of similarity, the collation device 10 need not include the first feature selection unit 30 and the first degree of similarity calculation unit 52.

For example, when the input vector, the registered vector, or each reference vector is a vector in which a plurality of features each binarized as "1" or "−1" are disposed in one row or one column, the first degree of similarity calculation unit 52 calculates the first degree of similarity by executing calculation indicated by Expression (2) below.

$$s(x_p, x_g; w_p) = 1 - \frac{d - (w_p \circ x_p)^T x_g}{2d} \quad (2)$$

Alternatively, for example, when the input vector, the registered vector, or each reference vector is a vector in which a plurality of features each binarized as "1" or "−1" are disposed in one row or one column, the second degree of similarity calculation unit 54 calculates the second degree of similarity by executing calculation indicated by Expression (3) below.

$$s(x_g, x_p; w_g) = 1 - \frac{d - (w_g \circ x_g)^T x_p}{2d} \quad (3)$$

In Expressions (2) and (3), $x_p$ represents the input vector, $x_g$ represents the registered vector, $w_p$ represents the first specification information in which bits indicating the d selected features are set to "1" and the other bits are set to "0", and $w_g$ represents the second specification information in which bits indicating the d selected features are set to "1" and the other bits are set to "0".

In Expressions (2) and (3), T represents vector transpose. In Expression (2), a circle character between $w_p$ and $x_p$ represents element-wise multiplication of the first specification information and the input vector. In Expression (3), a circle character between $w_g$ and $x_g$ represents element-wise multiplication of the second specification information and the registered vector.

Expression (2) provides the degree of similarity based on Hamming distance between the input vector in which any feature amount other than the d selected features specified by the first specification information is masked and the registered vector. Expression (3) provides the degree of similarity based on Hamming distance between the registered vector in which any feature amount other than the d selected features specified by the second specification information is masked and the input vector.

Effects of First Embodiment

As described above, the collation device 10 according to the present embodiment calculates the first degree of similarity between the registered vector and the input vector, with respect to the d selected features specified by the first specification information, and the second degree of similarity between the registered vector and the input vector, with respect to the d selected features specified by the second specification information. Then, the collation device 10 performs collation to determine whether the class to which the input data belongs is identical to the class to which the registered data belongs, based on the first degree of similarity and the second degree of similarity.

The first specification information is generated based on the input vector and the reference vectors. The second specification information is generated based on the registered vector and the reference vectors. Thus, the collation device 10 according to the present embodiment can perform accurate collation to determine whether the class to which the input data belongs is identical to the class to which the registered data belongs by using appropriately selected features obtained for each sample of the input data and each sample of the registered data based on the relation with the reference vectors.

The first specification information and the second specification information are generated based on the K reference vectors among the reference vectors. The K reference vectors for the input vector or the registered vector each have features similar to those of the input vector or the registered vector but are referred to as a class different from the class to which the input data or the registered data belongs. The first specification information and the second specification information specify the D features while excluding features similar to those of the K reference vectors to which the input vector and the registered vector each correspond.

Specifically, the first specification information and the second specification information specify features with which determination as a false class is unlikely to occur in each of the input vector and the registered vector. Thus, when the class to which the input data belongs is different from the class to which the registered data belongs but the degree of similarity based on the D features between the input vector and the registered vector is high, the collation device 10 according to the present embodiment can calculate a lowered degree of similarity based on the specified d selected features and thus can correctly perform collation.

Second Embodiment

The following describes the collation device 10 according to a second embodiment. In description of the second embodiment, a component having a configuration and a function substantially identical to those of a component described in the first embodiment is denoted by an identical reference sign, and detailed description thereof is omitted except for difference between the components.

Figure 6:
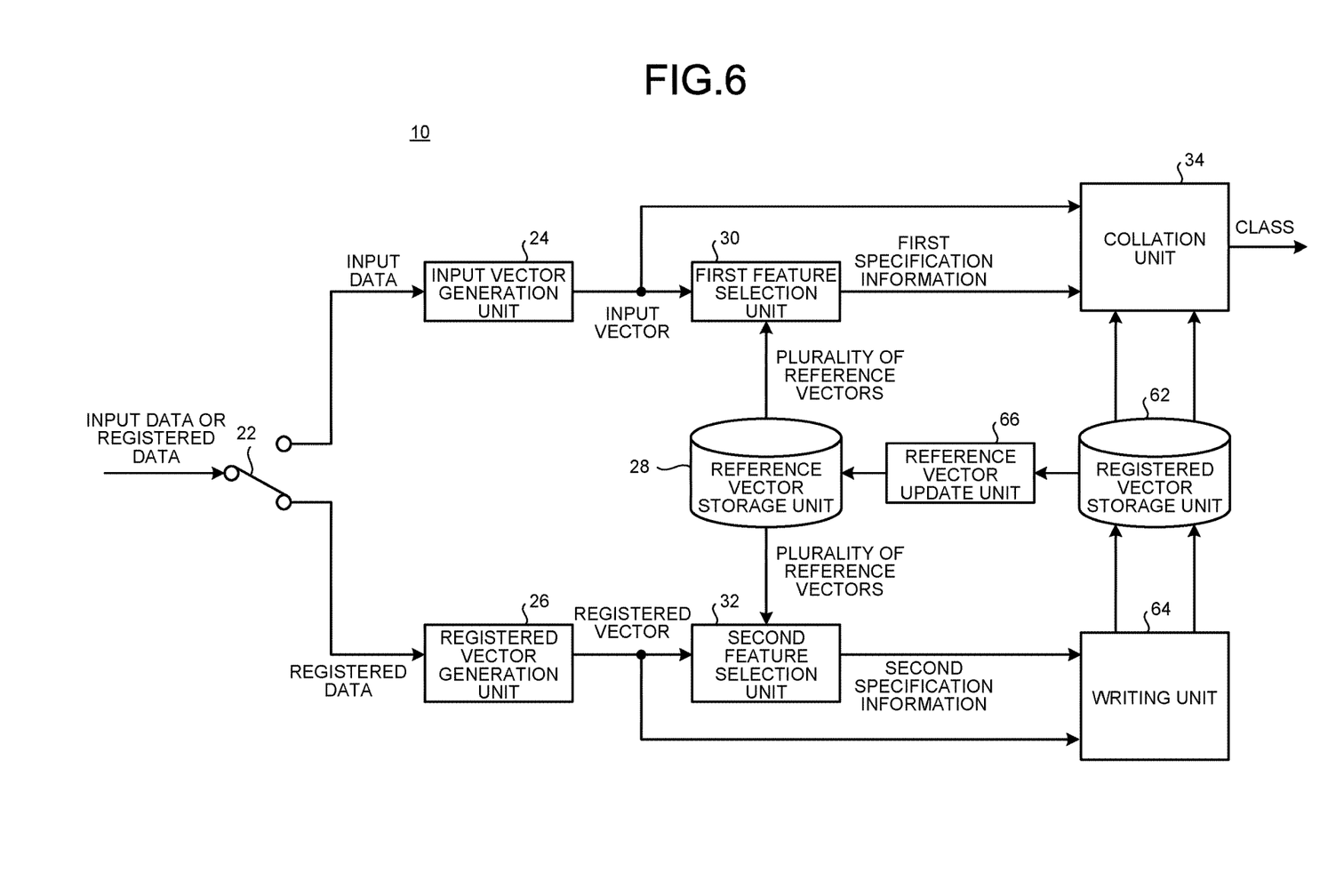
FIG. 6 is a diagram illustrating the configuration of the collation device according to a second embodiment.

FIG. 6 is a diagram illustrating a functional configuration of the collation device 10 according to the second embodiment. The collation device 10 according to the second embodiment stores one or more registered vectors in advance. Then, the collation device 10 acquires input data and performs collation to determine which class the acquired input data belongs to among one or more classes from which the stored one or more registered vectors come.

The collation device 10 according to the second embodiment further includes a registered vector storage unit 62, a writing unit 64, and a reference vector update unit 66 in addition to the configuration of the first embodiment.

In the second embodiment, the input unit 22 acquires one of the input data and the registered data. When having acquired the input data, the input unit 22 provides the input data to the input vector generation unit 24. When having acquired the registered data, the input unit 22 provides the registered data to the registered vector generation unit 26.

The registered vector storage unit 62 stores a registered data set. The registered data set includes one or more registered vectors and the second specification information corresponding to each of the one or more registered vectors.

When the registered data set includes a plurality of registered vectors, a plurality of registered data from which the plurality of registered vectors are derived may be associated with a plurality of classes in a one-to-one manner. Specifically, in this case, each of the plurality of registered data from which the plurality of registered vectors are derived belongs to a class different from those of the other registered data. Thus, in this case, the registered data set does not include two or more registered vectors belonging to an identical class. For example, when the registered data is face image data or person image data, the plurality of registered data of the plurality of registered vectors are face image data or person image data obtained by capturing images of persons different from each other. Thus, in this case, the registered data set does not include two or more registered vectors derived from face image data or person image data obtained by capturing an image of the same person.

When the registered data set includes a plurality of registered vectors, a plurality of registered data from which the plurality of registered vectors are derived may be associated with a plurality of classes in a one-to-many manner. In other words, a plurality of registered vectors may be associated with each class of the registered data set.

When the input unit 22 has acquired the registered data, the writing unit 64 acquires, from the registered vector generation unit 26, the registered vector derived from the acquired registered data. In addition, when the input unit 22 has acquired the registered data, the writing unit 64 acquires, from the second feature selection unit 32, the second specification information derived from the acquired registered data. In addition, when the input unit 22 has acquired the registered data, the writing unit 64 adds the acquired registered vector and the second specification information to the registered data set by writing the acquired registered vector and the second specification information to the registered vector storage unit 62.

When the registered data set includes a plurality of registered vectors associated with a plurality of classes in a one-to-one manner, the writing unit 64 determines, before the writing, whether the class of the registered vector to be written is identical to the class of any registered vector included in the registered data set. When the class of the registered vector to be written is identical to the class of any registered vector included in the registered data set, the writing unit 64 deletes the registered vector of the identical class included in the registered data set and the corresponding second specification information, and then writes the registered vector to be written and the corresponding second specification information. Alternatively, when the class of the registered vector to be written is identical to the class of any registered vector included in the registered data set, the writing unit 64 stops writing of the registered vector and the second specification information.

When the registered data set includes a plurality of registered vectors associated with a plurality of classes in a one-to-many manner, the writing unit 64 writes the registered vector to be written and the corresponding second specification information without performing the above determination.

When the input unit 22 has acquired the input data, the collation unit 34 acquires, from the input vector generation unit 24, the input vector derived from the acquired input data and acquires the first specification information from the first feature selection unit 30. In addition, the collation unit 34 acquires one or more registered vectors and one or more pieces of the second specification information from the registered vector storage unit 62. Then, the collation unit 34 perform collation to determine which class the input data belongs to among one or more classes to which one or more registered data from which one or more registered vectors stored in the registered vector storage unit 62 are derived belong.

For example, the collation unit 34 calculates, for each of the one or more registered vectors stored in the registered vector storage unit 62, the degree of similarity between the input vector and the target registered vector. In this case, the collation unit 34 calculates the degree of similarity between the input vector and the target registered vector based on the first degree of similarity and the second degree of similarity. For example, the collation unit 34 calculates, as the degree of similarity between the input vector and the target registered vector, the average value of the first degree of similarity and the second degree of similarity.

Subsequently, the collation unit 34 specifies a registered vector having a highest degree of similarity among the one or more registered vectors stored in the registered vector storage unit 62. Then, the collation unit 34 determines the class to which the registered data belongs as the class to which the input data belongs, the specified registered vector derived from the registered data.

When the highest degree of similarity is lower than a threshold set in advance, the collation unit 34 may determine that the input data belongs to no class. When a plurality of registered vectors are stored in the registered vector storage unit 62, the collation unit 34 may calculate a probability that the input data belongs to each of a plurality of classes.

The reference vector update unit 66 updates the reference vectors included in the reference data set stored in the reference vector storage unit 28 based on one or more registered vectors and one or more pieces of the second specification information included in the registered data set stored in the registered vector storage unit 62.

For example, when the registered data set includes a plurality of registered vectors associated with a plurality of classes in a one-to-one manner, the reference vector update unit 66 updates the reference data set stored in the reference vector storage unit 28 so that the registered vectors thereof become identical to the registered vectors included in the registered data set. When the registered data set includes two or more registered vectors coming from an identical class, the reference vector update unit 66 generates one reference vector based on the two or more registered vectors coming from an identical class and writes the generated reference vector to the reference vector storage unit 28. For example, the reference vector update unit 66 writes, as a reference vector to the reference vector storage unit 28, any one of the two or more registered vectors coming from an identical class. Alternatively, for example, the reference vector update unit 66 may write, as a reference vector to the reference vector storage unit 28, an average vector of the two or more registered vectors from an identical class.

Figure 7:
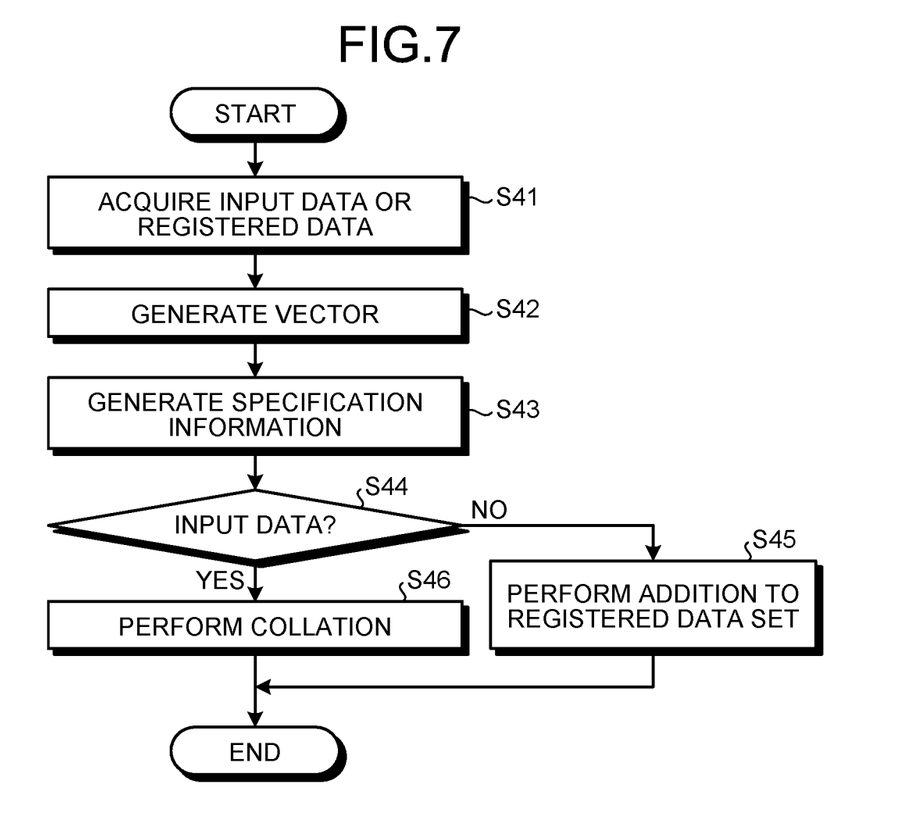
FIG. 7 is a flowchart illustrating the process of processing at the collation device according to the second embodiment.

FIG. 7 is a flowchart illustrating the process of processing at the collation device 10 according to the second embodiment. The collation device 10 according to the second embodiment executes processing through the process illustrated in FIG. 7.

First at S41, the collation device 10 acquires input data or registered data. Subsequently at S42, the collation device 10 generates the input vector when having acquired the input data or generates the registered vector when having acquired the registered data. Subsequently at S43, the collation device 10 generates the first specification information when having acquired the input data or generates the second specification information when having acquired the registered data.

Subsequently at S44, the collation device 10 determines whether the acquired data is the input data or the registered data. When the acquired data is the registered data (No at S44), the collation device 10 advances the process to S45. When the acquired data is the input data (Yes at S44), the collation device 10 advances the process to S46.

At S45, the collation device 10 adds the generated registered vector and the generated second specification information to the registered data set stored in the registered vector storage unit 62. When having completed the processing at S45, the collation device 10 ends the present process.

At S46, the collation device 10 executes collation processing based on the generated input vector, the generated first specification information, and a pair of each of the one or more registered vectors included in the registered data set and the second specification information. Specifically, the collation device 10 performs collation to determine which class the input data belongs to among one or more classes to which one or more registered data belong. When having ended the collation processing, the collation device 10 outputs a result of the collation and ends the present process.

Effects of Second Embodiment

As described above, when having acquired registered data, the collation device 10 according to the present embodiment writes the registered vector and the second specification information generated based on the acquired registered data to the registered vector storage unit 62. When having acquired input data, the collation device 10 performs collation to determine which class the input data belongs to among one or more classes to which one or more registered data from which one or more registered vectors stored in the registered vector storage unit 62 are derived belong.

In addition to the effects obtained by the first embodiment, the collation device 10 according to the present embodiment described above can perform accurate collation to determine which class the input data belongs to among one or more classes to one or more registered data belong by using appropriately selected features obtained for each sample of the input data and each sample of the registered data based on the closer relation with the reference vectors.

The collation device 10 according to the present embodiment generates the second specification information in advance and stores the registered data and the second specification information in advance. Accordingly, the collation device 10 does not need to execute a plurality of times of arithmetic processing on the same registered data, which leads to reduction of computational time.

Hardware Configuration

Figure 8:
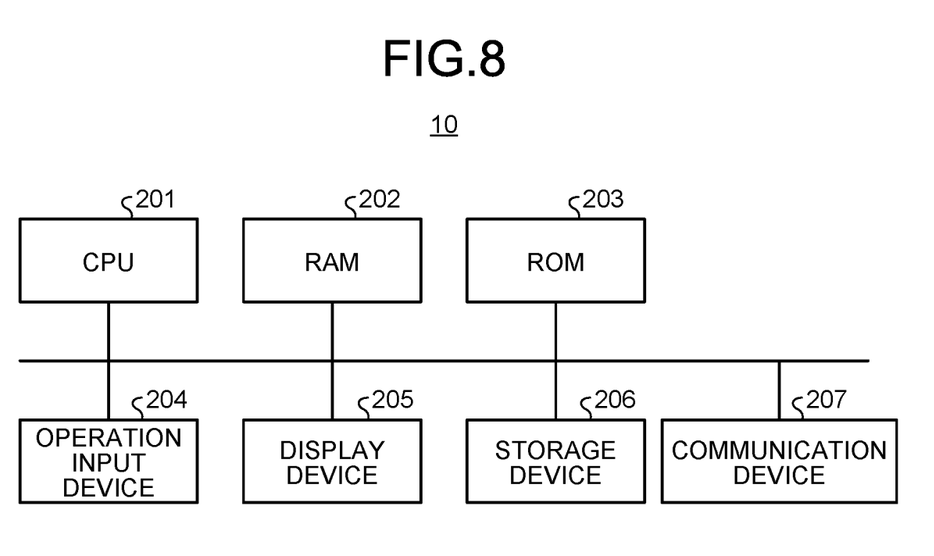
FIG. 8 is a diagram illustrating a hardware configuration of the collation device.

FIG. 8 is a diagram illustrating an exemplary hardware configuration of the collation device 10 according to each embodiment. The collation device 10 is achieved by, for example, an information processing device having a hardware configuration as illustrated in FIG. 8. The collation device 10 includes a central processing unit (CPU) 201, a random access memory (RAM) 202, a read only memory (ROM) 203, an operation input device 204, a display device 205, a storage device 206, and a communication device 207. These components are connected with each other through a bus.

The CPU 201 is a processor configured to executes arithmetic processing, control processing, and the like in accordance with a computer program. The CPU 201 executes various kinds of processing in cooperation with computer programs stored in the ROM 203, the storage device 206, and the like by using a predetermined region of the RAM 202 as a work area.

The RAM 202 is a memory such as a synchronous dynamic random access memory (SDRAM). The RAM 202 functions as a work area of the CPU 201. The ROM 203 is a memory configured to store computer programs and various kinds of information in an unwritable manner.

The operation input device 204 is an input device such as a mouse or a keyboard. The operation input device 204 receives, as an instruction signal, information input from a user through an operation and outputs the instruction signal to the CPU 201.

The display device 205 is a display device such as a liquid crystal display (LCD). The display device 205 displays various kinds of information based on display signals from the CPU 201.

The storage device 206 is a device configured to write and read data to and from a semiconductor storage medium such as a flash memory, a magnetically or optically recordable storage medium, or the like. The storage device 206 writes and reads data to and from a storage medium under control of the CPU 201. The communication device 207 performs communication with an external instrument through a network under control of the CPU 201.

A computer program executed by the collation device 10 has a module configuration including an input module, an input vector generation module, a registered vector generation module, a first feature selection module, a second feature selection module, and a collation module. The computer program is loaded and executed on the RAM 202 by the CPU 201 (processor) to cause the information processing device to function as the input unit 22, the input vector generation unit 24, the registered vector generation unit 26, the first feature selection unit 30, the second feature selection unit 32, and the collation unit 34. In addition, the computer program causes the RAM 202 and the storage device 206 to function as the reference vector storage unit 28. The collation device 10 is not limited to such a configuration but may have a configuration in which at least some of the input unit 22, the input vector generation unit 24, the registered vector generation unit 26, the first feature selection unit 30, the second feature selection unit 32, and the collation unit 34 are achieved by a hardware circuit (for example, a semiconductor integrated circuit).

The computer program executed by the collation device 10 is recorded and provided in a computer-readable recording medium such as a CD-ROM, a flexible disk, a CD-R, or a digital versatile disc (DVD) as a file in a form installable or executable on a computer.

The computer program executed by the collation device 10 may be stored on a computer connected with a network such as the Internet and may be downloaded and provided through the network. The computer program executed by the collation device 10 may be provided or distributed through a network such as the Internet. The computer program executed by the collation device 10 may be incorporated the ROM 203 or the like in advance and provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A collation device comprising:
a hardware processor configured to:
    generate, based at least in part on input data, an input vector comprising input data features indicating features of the input data, the input data features comprising D number of features, D being an integer equal to or larger than two;
    generate first specification information that specifies d selected features among the input data features of the input vector, based at least in part on a plurality of reference vectors and the input vector, the plurality of reference vectors each comprising reference features in a same form as the input vector, the reference features comprising the D number of features, d being an integer equal to or larger than one and smaller than D; and
    perform collation to determine whether a class to which the input data belongs is identical to a class to which registered data from which a registered vector is derived belongs, based at least in part on a degree of similarity between the input vector and the registered vector with respect to the d selected features specified by the first specification information, the registered vector comprising the D number of features in the same form as the input vector, wherein
    in generating of the first specification information, the hardware processor is configured to select the d selected features to lower a degree of similarity between the input vector for which a feature other than the d selected features is masked and each of the plurality of reference vectors, and specify the d selected features that have been selected.

2. The collation device according to claim 1, wherein the hardware processor is configured to select the d selected features to lower the degree of similarity between the input vector and each of K reference vectors among the plurality of reference vectors, to generate the first specification information that specifies the d selected features that have been selected, K being an integer equal to or larger than one.

3. The collation device according to claim 2, wherein
    the hardware processor is configured to, in processing of selecting the d selected features, select the d selected features specified by the first specification information, by excluding (D−d) features for which loss change amounts are large, from among the input data features,
    each of the loss change amounts is a change amount from a loss evaluation value when a target feature amount is included in the d selected features, to the loss evaluation value when the target feature amount is not included in the d selected features, and
    the loss evaluation value is a value depending on a degree of similarity between the input vector and each of the K reference vectors, a feature amount not included in the d selected features being masked in each of the input vector and the K reference vectors.

4. The collation device according to claim 1, wherein the hardware processor is configured to:
    select M reference vectors by excluding a particular number of reference vectors similar to the input vector, from among the plurality of reference vectors, M being an integer equal to or larger than 2, the particular number being any number equal to or larger than zero, and
    select K reference vectors sequentially from a highest degree of similarity similar to the input vector from among the M reference vectors, K being an integer equal to or larger than 1 and equal to or smaller than M; and to generate the first specification information
    select the d selected features to lower the degree of similarity between the input vector for which a feature other than the d selected features is masked and each of the K reference vectors.

5. The collation device according to claim 1, wherein the hardware processor is further configured to:
    acquire the input data and the registered data;
    generate the registered vector based at least in part on the registered data; and
    generate second specification information that specifies d number of selected features among the registered features of the registered vector, based at least in part on the plurality of reference vectors and the registered vector, and
    the hardware processor is configured to perform collation to determine whether the class to which the input data belongs is identical to the class to which the registered data belongs based at least in part on a first degree of similarity and a second degree of similarity, the first degree of similarity being a degree of similarity between the registered vector and the input vector with respect to the d selected features specified by the first specification information, the second degree of similarity being a degree of similarity between the input vector and the registered vector with respect to the d number of selected features specified by the second specification information.

6. The collation device according to claim 5, wherein the hardware processor is configured to select the d selected features to lower a degree of similarity between the registered vector and K reference vectors among the plurality of reference vectors, a feature amount other than the d selected features being masked in each of the registered vector and the K reference vectors, to generate the second specification information that specifies the d number of selected features that have been selected, K being an integer equal to or larger than one.

7. The collation device according to claim 6, wherein
    the hardware processor is configured to, in processing of selecting the d selected features, select the d number of selected features specified by the second specification information, by excluding (D−d) features for which loss change amounts are large, from among the registered features,
    each of the loss change amounts is a change amount from a loss evaluation value when a target feature amount is included in the d number of selected features to the loss evaluation value when the target feature amount is not included in the d number of selected features, and the loss evaluation value is a value depending on a degree of similarity between the registered vector and each of the K reference vectors, a feature amount not included in the d number of selected features being masked in each of the registered vector and the K reference vectors.

8. The collation device according to claim 7, wherein the hardware processor is configured to:
select M reference vectors by excluding a particular number of reference vectors similar to the registered vector from among the reference vectors, M being an integer equal to or larger than 2, the particular number being any number equal to or larger than zero;
select K reference vectors sequentially from a highest degree of similarity to the registered vector from among the M reference vectors, K being an integer equal to or larger than 1 and equal to or smaller than M; and
select the d selected features to lower the degree of similarity between the registered vector for which a feature other than the d selected features is masked and each of the K reference vectors.

9. The collation device according to claim 5, wherein the hardware processor is configured to perform collation to determine whether the class to which the input data belongs is identical to the class to which the registered data belongs based at least in part on an average value of the first degree of similarity and the second degree of similarity.

10. The collation device according to claim 5, further comprising a memory configured to store one or more registered vectors, and the second specification information corresponding to each of the one or more registered vectors,
the hardware processor is further configured to write the registered vector and the second specification information to the memory, and
the hardware processor is configured to:
acquire one of the input data or the registered data,
when the registered data has been acquired, write the registered vector and the second specification information generated based at least in part on the acquired registered data to the memory, and
when the input data has been acquired, perform collation to determine which class the input data belongs to among one or more classes to which one or more registered data sets from which the one or more registered vectors stored in the memory are derived belong.

11. The collation device according to claim 10, wherein the hardware processor is further configured to update the plurality of reference vectors based at least in part on the one or more registered vectors stored in the memory.

12. The collation device according to claim 1, wherein a plurality of original data sets from which the plurality of reference vectors are derived are associated with a plurality of classes in a one-to-one manner, each of the plurality of original data belongs to a corresponding class.

13. A collation method executed by an information processing device, the method comprising:
by the information processing device,
generating, based at least in part on input data, an input vector comprising input data features indicating features of the input data, the input data features comprising D number of features, D being an integer equal to or larger than two;
generating first specification information that specifies d selected features among the input data features of the input vector, based at least in part on a plurality of reference vectors and the input vector, the plurality of reference vectors each comprising reference features in the same form as the input vector, the reference features comprising the D number of features, d being an integer equal to or larger than one and smaller than D; and
performing collation to determine whether a class to which the input data belongs is identical to a class to which registered data from which a registered vector is derived belongs, based at least in part on a degree of similarity between the input vector and the registered vector with respect to the d selected features specified by the first specification information, the registered vector comprising registered features in the same form as the input vector, the registered features comprising the D number of features, wherein
generating the first specification information further comprises selecting the d selected features to lower a degree of similarity between the input vector for which a feature other than the d selected features is masked and each of the plurality of reference vectors, and specify the d selected features that have been selected.

14. A non-transitory computer program product comprising a computer readable medium comprising programmed instructions, wherein the instructions, when executed by a computer, cause the computer to function as:
an input vector generation unit configured to generate, based at least in part on input data, an input vector comprising input data features indicating features of the input data, the input data features comprising D number of features, D being an integer equal to or larger than two;
a first feature selection unit configured to generate first specification information that specifies d selected features among the input data features of the input vector, based at least in part on a plurality of reference vectors and the input vector, the plurality of reference vectors each including reference features in the same form as the input vector, the reference features comprising the D number of features, d being an integer equal to or larger than one and smaller than D; and
a collation unit configured to perform collation to determine whether a class to which the input data belongs is identical to a class to which registered data from which a registered vector is derived belongs, based at least in part on a degree similarity between the input vector and the registered vector with respect to the d selected features specified by the first specification information, the registered vector comprising registered features in the same form as the input vector, the registered features comprising the D number of features; wherein
the first feature selection unit is further configured to select the d selected features to lower a degree of similarity between the input vector for which a feature other than the d selected features is masked and each of the plurality of reference vectors, and specify the d selected features that have been selected.

* * * * *